(12) United States Patent
Montes

(10) Patent No.: US 12,481,739 B1
(45) Date of Patent: Nov. 25, 2025

(54) ELECTROENCEPHALOGRAM-BASED AUTHENTICATION SYSTEM FOR CREDENTIALING AND PERMISSIONED ACCESS

(71) Applicant: Gabriel A. Montes, Miami, FL (US)

(72) Inventor: Gabriel A. Montes, Miami, FL (US)

( * ) Notice: Subject to any disclaimer, the term of this patent is extended or adjusted under 35 U.S.C. 154(b) by 178 days.

(21) Appl. No.: 18/210,540

(22) Filed: Jun. 15, 2023

Related U.S. Application Data

(60) Provisional application No. 63/352,861, filed on Jun. 16, 2022.

(51) Int. Cl.
*G06F 21/32* (2013.01)
*G06N 20/00* (2019.01)

(52) U.S. Cl.
CPC .............. *G06F 21/32* (2013.01); *G06N 20/00* (2019.01)

(58) Field of Classification Search
CPC ................................ G06F 21/32; G06N 20/00
See application file for complete search history.

(56) References Cited

U.S. PATENT DOCUMENTS

| | | | | |
|---|---|---|---|---|
| 10,470,690 B2 * | 11/2019 | Hasegawa | ............ | A61B 5/6814 |
| 10,567,961 B2 * | 2/2020 | Castinado | ............ | G16H 10/60 |
| 11,647,015 B2 * | 5/2023 | LeClair | ................. | H04L 63/083 |
| | | | | 726/6 |
| 2017/0228526 A1 * | 8/2017 | Cudak | ................. | H04L 63/0861 |
| 2017/0281026 A1 * | 10/2017 | Nick | ..................... | A61B 5/7445 |
| 2018/0341848 A1 * | 11/2018 | Breuer | ..................... | G06N 3/02 |
| 2019/0132733 A1 * | 5/2019 | Castinado | ............. | G16H 30/40 |
| 2020/0201974 A1 * | 6/2020 | Xiong | ..................... | G06F 21/31 |
| 2023/0385390 A1 * | 11/2023 | Krishnagi | ............. | G06F 21/316 |

FOREIGN PATENT DOCUMENTS

WO    WO-2022045727 A1 *  3/2022

\* cited by examiner

*Primary Examiner* — Jonathan A Bui
(74) *Attorney, Agent, or Firm* — Sanchelima & Associates, P.A.; Jesus Sanchelima; Christian Sanchelima

(57) ABSTRACT

An electroencephalogram (EEG) based authentication system for credentialing and permissioned access including an electroencephalogram device and at least one computerized device in communication with a server via a network. The server contains an EEG patterns database, a credential database, and an access control database. The server includes an authentication module and a credentialing module using machine learning algorithms that work with the databases of the server to match predetermined brainwave patterns with an unique ID and to provide permissioned access based on a state of mind determined by real time classification of the brainwave patterns. The brainwave patterns are acquired through the electroencephalogram device.

7 Claims, 4 Drawing Sheets

ELECTROENCEPHALOGRAM-BASED AUTHENTICATION SYSTEM FOR CREDENTIALING AND PERMISSIONED ACCESS

1. OTHER RELATED APPLICATIONS

The present application is a U.S. Non-Provisional Patent Application claiming priority of U.S. Provisional Patent Application, Ser. No. 63/352,861 filed on Jun. 16, 2022, which is hereby incorporated by reference.

2. FIELD OF THE INVENTION

The present invention relates to an electroencephalogram (EEG) based authentication system for credentialing and permissioned access and, more particularly, to an EEG-based authentication system for credentialing and permissioned access that allows identifying a user's identity through machine learning pattern recognition of brainwave patterns and providing permissioned access accordingly

3. DESCRIPTION OF THE RELATED ART

Several designs for EEG-based authentication systems have been designed in the past. None of them, however, include a dynamic system for electroencephalogram patterning recognition capable of collecting, analyzing and matching in real time an EEG pattern with a predetermined user in order to authenticate user's identity and provide permissioned access.

Applicant believes that a related reference corresponds to U.S. Pat. No. 10,567,961 issued for a system for electroencephalogram patterning recognition for authentication. Applicant believes that another related reference corresponds to U.S. Pat. No. 10,470,690 issued for an authentication device using brainwaves, authentication method, authentication system and program. None of these references, however, teach of an innovative EEG-based authentication system that utilizes advanced machine learning algorithms to recognize real-time EEG patterns associated with a predetermined user and accurately determine the user's instantaneous state of mind, thus enabling secure and permissioned access.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an EEG-based authentication system for credentialing and permissioned access that includes an EEG device for portable and accessible EEG data acquisition.

It is another object of this invention to provide an EEG-based authentication system for credentialing and permissioned access that includes an authentication module to verify user's identity and a permissioned access module to determine instantaneous state of mind in order to provide permissioned access.

It is still another object of the present invention to provide an EEG-based authentication system for credentialing and permissioned access that includes selectively analyzing EEG data to verify a user's identity in such a way that a state of mind, can be associated with a predetermined user in order to identify that user. State of mind may be drawn from various sources of dynamic (changing/variable) brain activity within a given individual brain, which may include but are not limited to breathing patterns, jaw clenching, eye movements, thoughts, emotions, and other patterns of brain activity that can vary within an individual.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
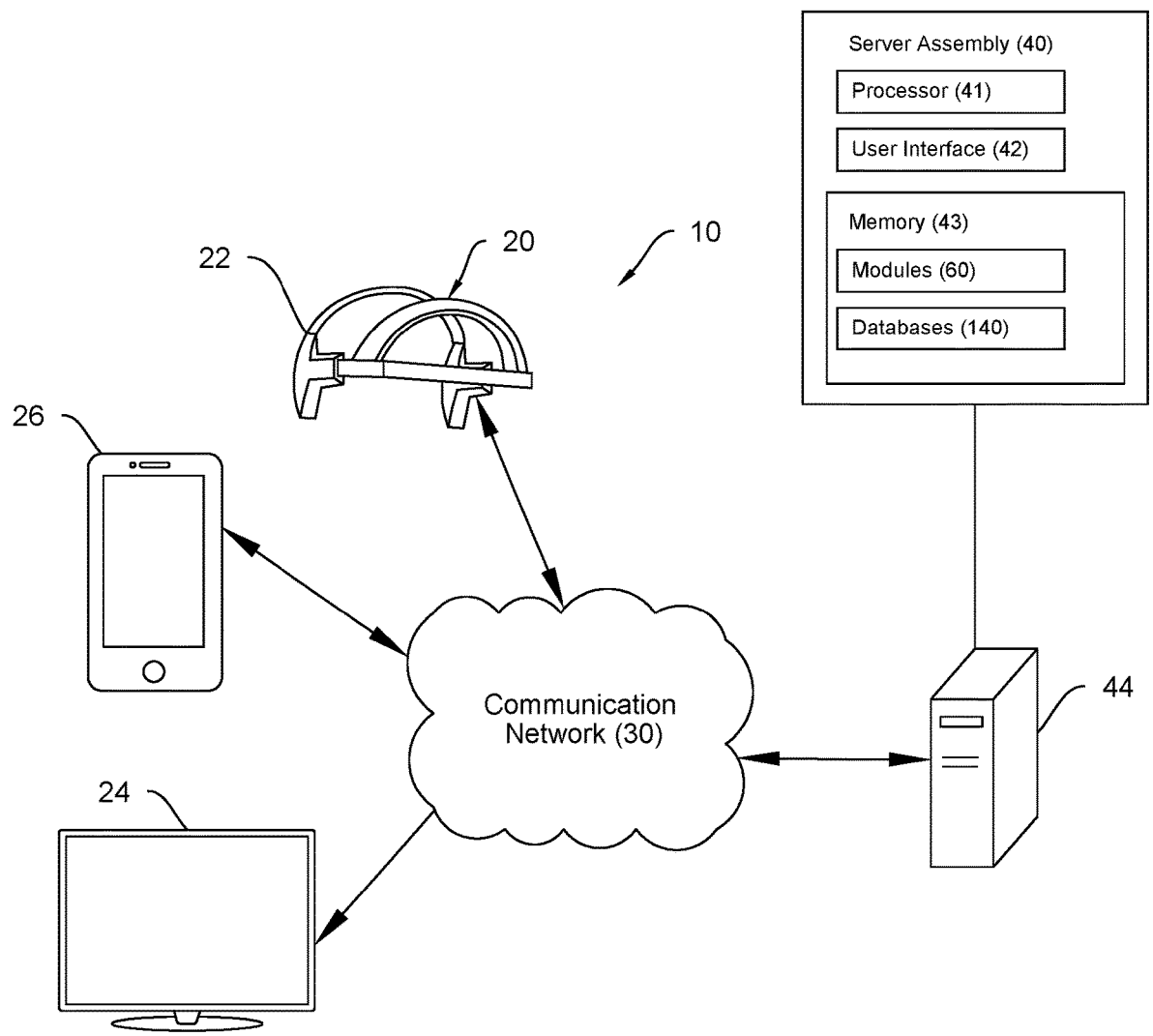
FIG. 1 represents a network connection diagram of the EEG device 22 communicating with a server assembly 40 via communication network 30.

Referring now to the drawings, where the present invention is generally referred to with numeral 10, it can be observed that it basically includes a hardware assembly 20, a communication network 30, a server assembly 40, modules 60, and databases 140. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Best illustrated in FIG. 1 the hardware assembly 20 may include an EEG device 22 and at least one computerized device 24. In a preferred embodiment the EEG device 22 may be an in-ear EEG device. In-ear devices normally consist of small, specialized electrodes embedded with earbuds or earpieces that are comfortably positioned inside the user's ear. It also may be suitable for the EEG device to be an EEG headset, a forehead EEG electrode set, or any other wearable EEG device known in the art. In one embodiment the EEG device 22 may include two electrodes. It should be understood that the number of electrodes in the EEG device 22 may vary according to the type of EEG being used. It should be understood that the EEG device 22 may include wired or wireless connection capabilities.

It may be suitable to define the at least one computerized device 24 as a stationary computing device that also includes wired or wireless connection capabilities. It should be understood that at least one computerized device 24 may include any electronic equipment having hardware and software that enables it to perform computational tasks, process data, and execute instructions. For instance, the at least one computerized device may include but is not limited to a mobile device 24', augmented reality glasses 24", Virtual Reality Headsets 24''', a desktop computer 24'''', and so on. It should be understood that the at least one computerized device 24 may also include peripherals such as headphones, speakers, microphones, and so on. The mobile device 24' may include a variety of handheld devices such as a tablet, a mobile phone, a smartphone, a laptop, a smart watch or any device with wireless or wired connection capabilities. The EEG device 22 and the at least one computerized device 24 may be in communication with a server 44 of the server assembly 40 via a communication network 30. The communication network 30 may include multiple embodiments such as, WLAN wireless local area network, wireless data communication such as LTE long term evolution, 5G, or 6G, a wired ethernet connection, or any other suitable communication network as known in the art.

The server 44 may include a processor 41, a user interface 42, a memory 43. The user interface 42 may take the form of a command line interface, a graphical user interface, an audio interface, or a web-based interface. It may be preferable for the memory 43 to be embodied as a hard drive, a network attached storage, or other type of machine-readable medium for the storage of electronic instructions. In one iteration of the present invention 10, databases 140 may be stored within the memory 43 of the server 44.

Figure 2:
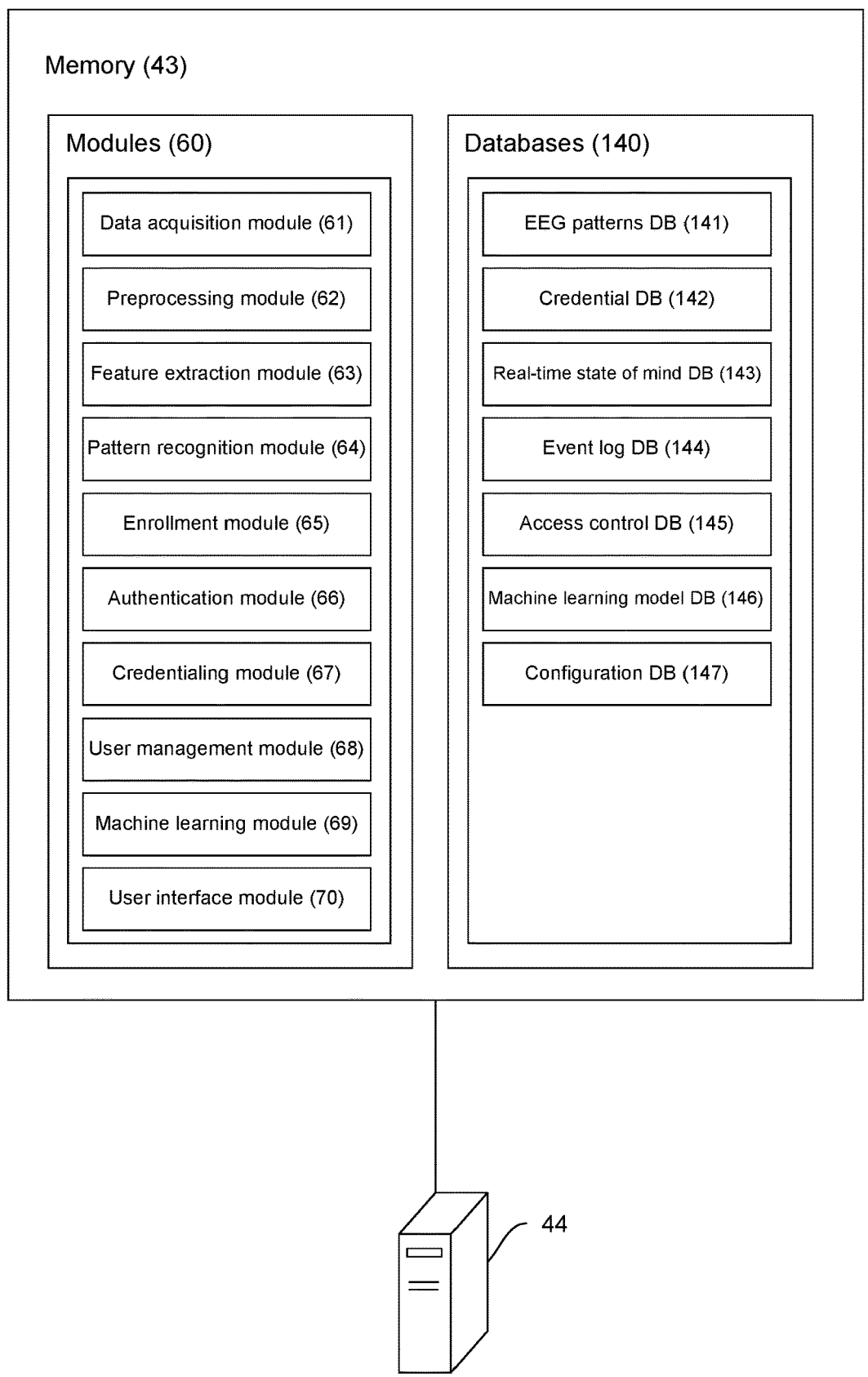
FIG. 2 shows an overview of databases 140 and content modules 60 stored on memory 43 of the server 44 according to the present embodiment.

The databases 140 may include an EEG patterns database 141, a credential database 142, a real-time state of mind database 143, an event log database 144, an access control database 145, a machine learning model database 146 and a configuration database 147. Best shown in FIG. 2, modules 60 may also be stored within the memory 43. Wherein the modules 60 may further include a data acquisition module 61, a preprocessing module 62, a feature extraction module 63, a pattern recognition module 64, an enrollment module 65, an authentication module 66, a credentialing module 67, an user management module 68, a machine learning module 69, and an user interface module 70.

In one embodiment, users have the option to register with the enrollment module 65 for identity authentication using their unique brainwave patterns, where the unique brainwave patterns are reflected in different states of mind. For instance, brainwave patterns of a first user in a relaxed state may be unique when compared to a second user in a relaxed state and so on, where the different states of mind are dynamic states of mind which are identified in brainwave patterns. To acquire EEG data, the EEG device 22 can be positioned on the scalp, ears, or any other suitable location to effectively capture the electrical signals generated by the brain. Data acquisition may be supported by the data acquisition module 61. The preprocessing module 62 may allow preprocessing EEG signals according to their frequency. EEG frequency bands are associated with different mental states, cognitive processes and physiological context. For instance, waves over 35 Hz are normally associated with high-level cognitive process perception whereas waves between 0.1 to 0.5 Hz can be associated with breathing activity and waves in the band of 8 Hz to 12 Hz to a relaxed reflection state of mind. Therefore, the preprocessing module 62 may include filtering means which may be preferably an infinite impulse response (IIR) bandpass filter or an IIR high pass filter. In a preferred embodiment the frequency bands considered in the preprocessing module 62 may be a frequency range of 0.1 Hz to 0.5 Hz, a frequency range of 12 Hz to 100 Hz, a frequency range of 0.1 HZ to 100 Hz, or a combination thereof. It should be understood that the frequency ranges may vary and they may be used together or separately to characterize the brain waves of a user. The aforementioned frequency ranges are herein included for explanatory purposes, and does not limit the present invention to solely/exclusively use those frequencies.

The feature extraction module 62 may allow the extraction of meaningful features from the preprocessed EEG data. The features may include time domain features and frequency domain features. In a preferred embodiment time domain features include but are not limited to: Zero Crossing Rate, Variance, Skewness, Kurtosis, Log Energy, crest factor, shape factor, impulse factor, mobility, complexity and margin factor. Frequency domain features include but are not limited to: Mean frequency, spectral flux, spectral crest, spectral flatness, spectral skewness, spectral centroid, spectral kurtosis, spectral slope, spectral decrease and spectral entropy.

Machine learning module 69 classifies the features obtained by the feature extraction module 62 through machine learning algorithms. In one embodiment the machine learning module 62 may use Support Vector Machines (SVM) and/or AdaBoost algorithms. It should be noted that SVM is a supervised learning algorithm that belongs to the broader family of kernel methods and AdaBoost is an ensemble learning algorithm that combines multiple weak classifiers to create a strong classifier where both can be used along with a neural network to determine a real state of mind or to improve authentication. It should be understood that the use of SVM and AdaBoost algorithms are exemplary and should not be taken in a limiting sense. The machine learning module 62 may use any other machine learning algorithm known in the art.

It should be noted that the machine learning module 69 has the capability to be trained on new and unseen EEG samples in order to classify them for each of a plurality of users, as the distinctive patterns exhibited by the brainwaves form a unique ID. The machine learning module 69 may be stored in the machine learning model database. The machine learning module 69 may be trained to identify the ID (if predetermined EEG data corresponds to a predetermined user). To register a second predetermined user machine learning module 69 may be trained to identify the second predetermined user. The pattern recognition module 64 may be adapted to recognize brainwave patterns from the machine learning module 64 to determine if different brainwave patterns correspond to a predetermined user. Corresponding brainwave patterns may be stored in the EEG patterns database 141. After enrollment performed in the enrollment module 65, the machine learning module 69 and the pattern recognition module 64 may be able to determine in the authentication module 66 if predetermined brain waves correspond to a predetermined user.

Figure 3:
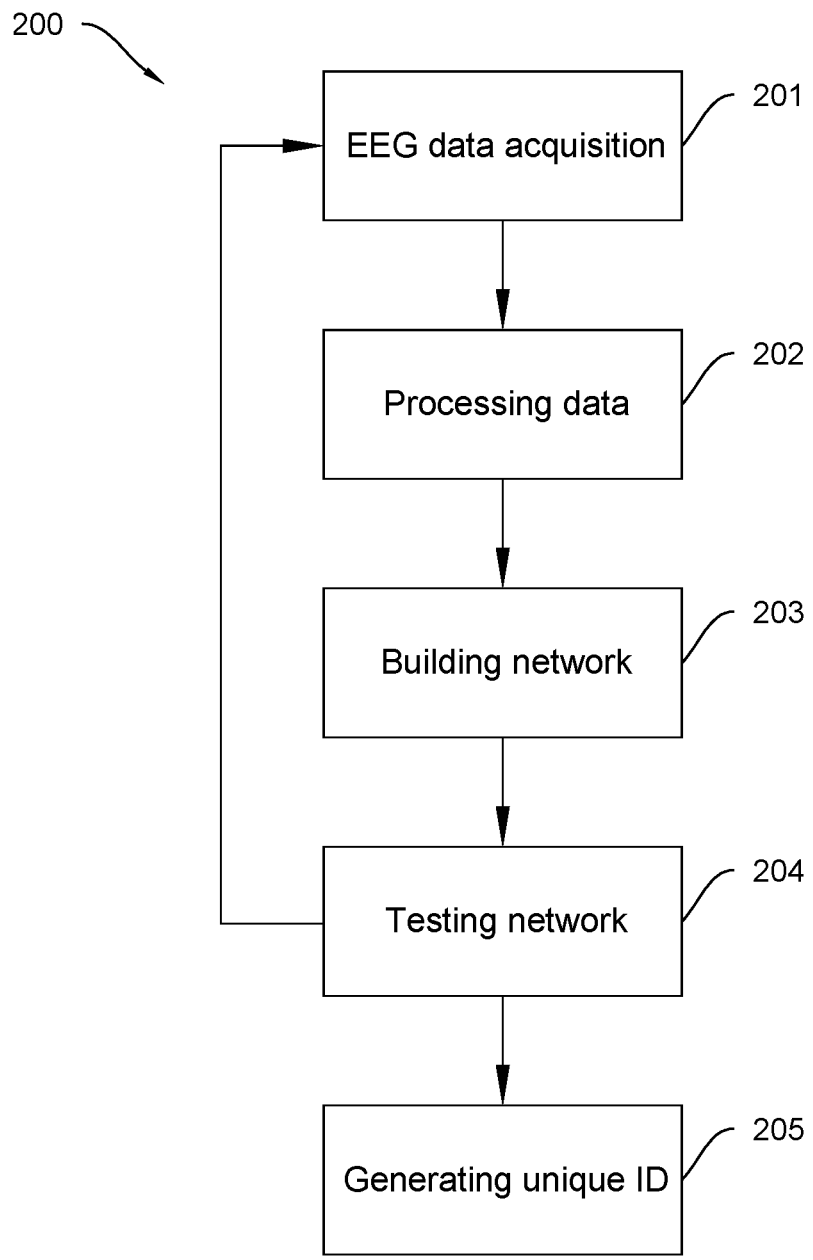
FIG. 3 illustrates a schematic diagram flow of user authentication process 200.

As best illustrated in FIG. 3, generation of an unique ID may follow the process 200. The process 200 may include a first step 201, a second step 202, a third step 203, a fourth step 204, and a fifth step 205. The first step 201 may include EEG data acquisition. The second step 202 may include processing the data. The third step 203 may include building a neural network or machine learning algorithm/model to classify the features. The fourth step 204 may include testing the network. And the fifth step 205 may be generating the unique ID based on the machine learning recognition of brain waves. Once the unique ID is generated to be recognized it is stored in the credential database 142 so it can be used again to authenticate the user. It should be understood that the corresponding user ID stored in the credential database 142 serves as an identifier for a specific user. It should be noted that the unique ID may preferably be used with a multi-factor authentication. For instance, the authentication module 67 may also include biometric authentication means such as fingerprint authentication technologies, face recognition authentication; password-based authentication, or any other authentication technology known in the prior art. User interface module 70 may allow interacting with the authentication module 66, the credentialing module 67, and the enrollment module 65. In a preferred embodiment the unique ID may be displayed and managed in the at least one computerized device 24. It should be understood that the at least one computerized device 24 may be used for local processing, displaying data and managing the different modules of the present invention 10. The user management module 68 may allow an administrator to manage a plurality of unique ID or the user to manage his personal unique ID and account.

The credentialing module 67 may allow permissioned access based on predetermined rules or limitations stored in the access control database 145. The permissioned access may be given to a user if his/her real-time state of mind meets the predetermined rules or limitations. The credentialing module 67 enables permissioned access based on predefined rules or limitations stored in the access control database 145. Access may be granted to a user if their real-time state of mind aligns with the predetermined criteria. This approach proves particularly suitable for high-security facilities like government buildings, research laboratories, or military installations, where permissioned access is contingent upon the user attaining specific mental states such as relaxation or focus. This approach may also be used in other areas, such as entertainment, where a user gains access to particular combinations of multi-sensory stimuli (such as audio-visuals, music, etc.) given their dynamic brain state (state of mind), and/or unique ID.

The data acquisition module 61, the preprocessing module 62, the feature extraction module 63 and the pattern description module 64 may be used to determine a real-time state of mind. The pattern recognition module 64 may associate predetermined brain wave patterns to identify if the brainwave patterns correspond to a predetermined user and determine a state of mind for the user. The machine learning module 69 may allow to classify a real-time state of mind for a predetermined user and provide permissioned access based on whether the user meets the rules established in the access control database 145. It should be noticed that in order to provide permissioned access for a predetermined user, the user may have to authenticate his/her identity through the authentication module 66.

In a preferred embodiment the machine learning module 69 may use an artificial neural network for EEG classification and real-time brain wave pattern recognition. The artificial neural network may be used for a wide range of EEG classification tasks, such as detecting seizures, identifying sleep stages, predicting cognitive states and so on. The information regarding permissioned access may be stored in the credential database 142. It should be understood that permissioned access may include permission to perform or access to a predetermined program, entertainment feature, activity, or the like based on a real-time state of mind. Thus, permissioned access may be granted a first time but denied a second time depending on whether the real-time state of mind of the user meets the criteria to perform or access a predetermined program, entertainment feature, activity, or the like. In one embodiment the user may receive stimuli through the user interface indicating through sight, sound, touch and so on suggestions and/or presentations of places and activities based on his/her real-time (dynamic) state of mind. It should be understood that dynamic makes reference to ever-changing brain activity according to time and circumstance. Moreover, data about registered real-time state of mind may be stored in the real-time state of mind database 143 so that the machine learning module 69 can be trained with a larger set of data in order to improve accuracy. Data for new EEG patterns may be stored in the EEG patterns database 141. Event log of authentication and credentialing process 300 may be stored in the Event log database 144. Event log may be used to track record of previous permissioned access, failures to have permissioned access, authentication events, and so on.

Figure 4:
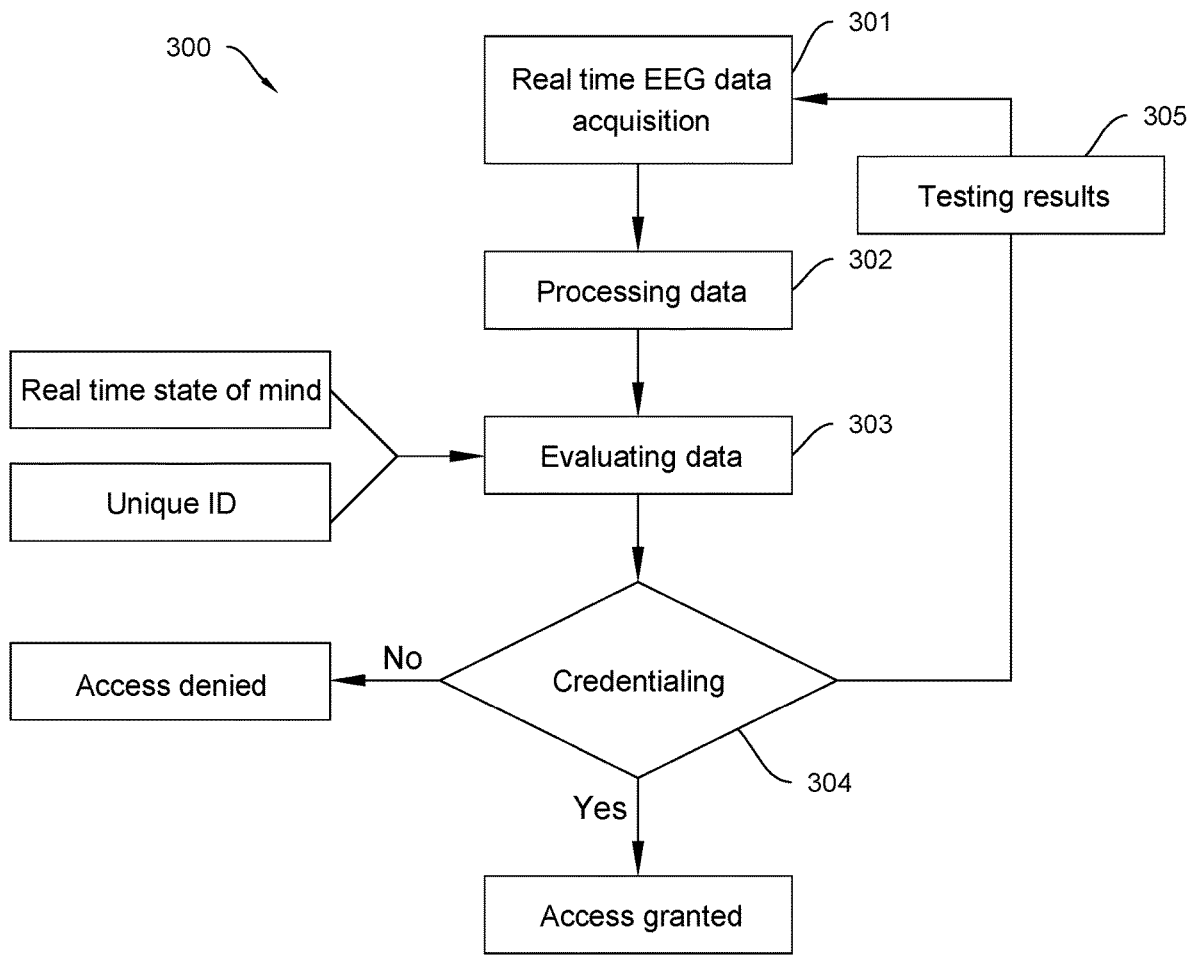
FIG. 4 is a representation of a schematic diagram flow of credentialing process 300.

Referring now to FIG. 4 it can be observed that the credentialing process 300 may include a first step 301, a second step 302, a third step 303, a fourth step 304, and a fifth step 305. The first step 301 may include acquisitioning of real time EEG data. The second step 302 may include processing the real time EEG data. The third step 303 may include evaluating the processed data. The evaluation may take into account if the real-time data matches with the user's unique ID and if the user meets requirements for permissioned access. The fourth step 304 may include credentialing based on the evaluated data. The fifth step 305 may include testing and incorporating the results to the machine learning model.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electroencephalogram (EEG) based authentication system for credentialing and permissioned access, comprising:

an electroencephalogram device and at least one computerized device in communication with a server via a network, said server containing databases, said databases including an electroencephalogram patterns database, a credential database and an access control database, said server further includes at least one software that includes an authentication module and a credentialing module that use machine learning algorithms that works with said electroencephalogram patterns database, with said credential database and with said access control database, wherein said electroencephalogram device is a wearable EEG device, wherein said server further includes a preprocessing module configured to filter EEG signals acquired by said wearable EEG device using an Infinite Impulse Response (IIR) bandpass filter within a frequency range of 0.1 Hz to 100 Hz to characterize brainwave patterns associated with a user's real-time state of mind, wherein user's predetermined brainwave patterns are acquired to said electroencephalogram patterns database by means of said electroencephalogram device that when acquired cause the system to:

a) match said predetermined brainwave patterns with a corresponding user ID in said authentication module, wherein said predetermined brainwave patterns are classified and processed by means of said machine learning module, wherein said corresponding user ID is stored in said credential database, wherein said corresponding user ID stored in the credential database serves as an identifier for a specific user; and b) provide a permissioned access to a predetermined user through said credentialing module when said corresponding user ID matches said predetermined brainwave patterns and said predetermined brainwave patterns aligns with a pre established criteria, wherein said pre established criteria is associated with required brainwave patterns necessary to perform a predetermined task in said authentication module, wherein said required brainwave patterns are associated to a required real-time state of mind of said predetermined user, wherein said required brainwave patterns are stored in an access control database of said server.

2. The electroencephalogram based authentication system for credentialing and permissioned access set forth in claim 1, wherein said machine 7 learning algorithms include support vector machine algorithms and adaptive boosting algorithms.

3. The electroencephalogram based authentication system for credentialing and permissioned access set forth in claim 1, wherein said server includes an event log database, wherein said event log database is capable of storing each event 13 of said at least one software.

4. The electroencephalogram based authentication system for credentialing and permissioned access set forth in claim 1, wherein said user interface module runs in said at least one computerized device, said user interface is operated to interact with modules of said server through said at least one computerized device.

5. The electroencephalogram based authentication system for credentialing and permissioned access set forth in claim 1, wherein said server further includes a data acquisition module, a preprocessing module, a feature extraction module and a pattern recognition module, wherein said data acquisition module acquires data from said electroencephalogram device.

6. An electroencephalogram (EEG) based authentication system for credentialing and permissioned access, comprising:
   an electroencephalogram device and at least one computerized device in communication with a server via a network, said server containing databases, said databases including an electroencephalogram patterns database, a credential database and an access control database, said server further includes at least one software that includes an authentication module, an user interface module and a credentialing module that use machine learning algorithms that works with said electroencephalogram patterns database, with said credential database and with said access control database, wherein said electroencephalogram device is a wearable EEG device, wherein said server further includes a preprocessing module configured to filter EEG signals acquired by said wearable EEG device using an Infinite Impulse Response (IIR) filter within a frequency range of 0.1 Hz to 100 Hz to characterize brainwave patterns associated with a user's real-time state of mind, wherein user's predetermined brainwave patterns are acquired to said electroencephalogram patterns database by means of said electroencephalogram device that when acquired cause the system to:
   a) match said predetermined brainwave patterns with a corresponding user ID in said authentication module, wherein said predetermined brainwave patterns are classified and processed by means of said machine learning module, wherein said corresponding user ID is stored in said credential database, wherein said corresponding user ID stored in the credential database serves as an identifier for a specific user; and
   b) provide a permissioned access to a predetermined user through said credentialing module when said corresponding user ID matches said predetermined brainwave patterns and said predetermined brainwave patterns aligns with a pre established criteria, wherein said pre established criteria is associated with task-specific brainwave patterns required required to perform a predetermined task within said authentication module, wherein said task-specific brainwave patterns are associated to a required real-time state of mind of said predetermined user, wherein said task-specific brainwave patterns are stored in an access control database of said server in such a way that if state of mind of a user matches with said required real-time state of mind associated with said predetermined criteria to perform a task then said user is permitted to perform said task, wherein said software is configured to display, in said user interface module, tasks that said predetermined user is permitted to perform and to provide real-time feedback on the user's current state of mind relative to the required real-time state of mind for the predetermined task, enabling the user to adjust their mental state to meet said pre established criteria, said user interface is operated to interact with modules of said server through said at least one computerized device.

7. An electroencephalogram (EEG) based authentication system for credentialing and permissioned access, consisting of:
   an electroencephalogram device and at least one computerized device in communication with a server via a network, said server containing databases, said databases including an electroencephalogram patterns database, a credential database and an access control database, said server further includes at least one software that includes an authentication module, an user interface module, a data acquisition module, a preprocessing module, a feature extraction module, a pattern recognition module, and a credentialing module that use machine learning algorithms that works with said electroencephalogram patterns database, wherein said data acquisition module acquires data from said electroencephalogram device, wherein said machine learning algorithms include support vector machine algorithms and adaptive boosting algorithms, with said credential database and with said access control database, wherein said electroencephalogram device is an in-ear EEG device having electrodes embedded within earbuds or earpieces positioned inside a user's ear, wherein said preprocessing module filters EEG signals acquired by said in-ear EEG device using an Infinite Impulse Response (IIR) filter within a frequency range of 0.1 Hz to 100 Hz to characterize brainwave patterns associated with a user's real-time state of mind, wherein user's predetermined brainwave patterns are acquired to said electroencephalogram patterns database by means of said electroencephalogram device that when acquired cause the system to:
   a) match said predetermined brainwave patterns with a corresponding user ID in said authentication module, wherein said predetermined brainwave patterns are classified and processed by means of said machine learning module, wherein said corresponding user ID is stored in said credential database, wherein said corresponding user ID stored in the credential database serves as an identifier for a specific user; and b) provide a permissioned access to a predetermined user through said credentialing module when said corresponding user ID matches said predetermined brainwave patterns and said predetermined brainwave patterns aligns with a pre established criteria, wherein said pre established criteria is associated with required brainwave patterns required to perform a predetermined task within said authentication module, wherein said required brainwave patterns are associated to a required real-time state of mind of said predetermined user, wherein said required brainwave patterns are stored in an access control database of said server in such a way that if state of mind of a user matches with said required real-time state of mind associated with said predetermined criteria to perform a task then said user is permitted to perform said task, wherein said software is configured to display in said user interface module tasks that said predetermined user is permitted to perform, said user interface is operated to interact with modules of said server through said at least one computerized device.

\* \* \* \* \*